United States Patent
Ando et al.

(10) Patent No.: US 9,188,168 B2
(45) Date of Patent: Nov. 17, 2015

(54) CLUTCH PLATE

(75) Inventors: Junji Ando, Anjo (JP); Kunihiko Suzuki, Gamagori (JP); Kazutaka Matsukawa, Kariya (JP); Hiroyuki Ando, Takahama (JP); Takuya Tsuda, Tokorozawa (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 14/237,457

(22) PCT Filed: Aug. 24, 2012

(86) PCT No.: PCT/JP2012/071483
§ 371 (c)(1),
(2), (4) Date: Feb. 6, 2014

(87) PCT Pub. No.: WO2013/027834
PCT Pub. Date: Feb. 28, 2013

(65) Prior Publication Data
US 2014/0182995 A1     Jul. 3, 2014

(30) Foreign Application Priority Data
Aug. 24, 2011   (JP) .................. 2011-182766

(51) Int. Cl.
| F16D 13/74 | (2006.01) |
| F16D 69/00 | (2006.01) |
| F16D 13/62 | (2006.01) |
| F16D 13/64 | (2006.01) |
| F16D 27/00 | (2006.01) |

(52) U.S. Cl.
CPC ............... *F16D 13/74* (2013.01); *F16D 13/62* (2013.01); *F16D 13/64* (2013.01); *F16D 13/648* (2013.01); *F16D 69/00* (2013.01); *F16D 27/004* (2013.01); *F16D 2027/008* (2013.01); *F16D 2069/004* (2013.01)

(58) Field of Classification Search
None
See application file for complete search history.

(56) References Cited

U.S. PATENT DOCUMENTS 2,062,480 A * 12/1936 Stanley ................ 192/107 M
7,815,028 B2 * 10/2010 Ando et al. ............... 192/35

(Continued)

FOREIGN PATENT DOCUMENTS

| JP | 63 49303 | 3/1988 |
| JP | 11 303911 | 11/1999 |
| JP | 2002 130323 | 5/2002 |

(Continued)

OTHER PUBLICATIONS

International Search Report Issued Nov. 20, 2012 in PCT/JP12/071483 Filed Aug. 24, 2012.

*Primary Examiner* — Ramya Burgess
*Assistant Examiner* — Mark Manley
(74) *Attorney, Agent, or Firm* — Oblon, McClelland, Maier & Neustadt, L.L.P.

(57) ABSTRACT

In a clutch plate of an annular shape and a wet type, a plurality of lubrication grooves each taking a U-shape in cross-section are formed on a friction engaging surface on at least one end side. The groove is provided with a groove forming portion crossing the circumferential direction and blunt portions extending along both sides of the groove forming portion and connecting the friction engaging surface with the groove forming portion. Where a straight line passing across one side end of the groove and extending in a radial direction is assumed as a virtual straight line, in a section of the groove taken along a plane that is orthogonal to the virtual straight line and that includes the one side end, the width of the blunt portion on one side is in a range of 0.12 to 0.35 mm, and the depth of the blunt portion is in a range of 25 to 50 μm.

3 Claims, 7 Drawing Sheets

(56) References Cited

U.S. PATENT DOCUMENTS

2002/0046912 A1 4/2002 Suzuki
2003/0106758 A1* 6/2003 Hirota et al. .................. 192/35

FOREIGN PATENT DOCUMENTS

| JP | 2002 213485 | 7/2002 |
| JP | 2010 19365 | 1/2010 |

* cited by examiner

CLUTCH PLATE

TECHNICAL FIELD

The present invention relates to a clutch plate of a wet type having lubrication grooves.

BACKGROUND ART

Heretofore, there has been known a friction clutch that performs a power transmission by frictionally engaging clutch plates on a driving side with clutch plates on a driven side. Further, there has been also known a friction clutch of an electromagnetic type that uses a clutch plate formed with a plurality of windows being arc-shaped through holes. The windows are required to complete a magnetic circuit. The friction clutch of the electromagnetic type is described in JP11-303911A for example.

Further, an electronically controlled 4WD coupling (ITCC (registered trademark)) using an electromagnetic friction clutch is also described in JP2002-213485A for example.

Lubrication oil is interposed between the clutch plates. Then, lubrication grooves are formed on end surfaces (sliding surface) in the axial direction of the clutch plates for retaining the lubrication oil and for discharging the same from between the plates at the time of friction engagement of the plates with each other.

SUMMARY OF THE INVENTION

Problem to be Solved by the Invention

In a clutch mechanism of a wet type that lubrication oil is interposed between plates as described above, a so-called dragging torque is generated due to an engaging force caused by the viscosity of the lubrication oil interposed therebetween even when the clutch is in a state of being out of operation. For example, in the driving force transmission devices (refer to Patent Documents 1 and 2) having a main clutch mechanism, a pilot clutch mechanism and a cam mechanism, a dragging torque is generated when the pilot clutch is in a state of being out of operation, and the dragging torque is converted and amplified by the cam mechanism into a pressuring force in the axial direction to bring the main clutch into friction engagement. Thus, this may result in drawbacks such as a torque transmission at the time of the control being not executed, the heating of the main clutch caused by the friction between respective clutch plates, or the like.

Accordingly, a clutch plate capable of decreasing a dragging torque has been required. The dragging torque depends on the viscosity of lubrication oil and increases as the temperature goes down. That is, decreasing the dragging torque at low temperatures has become a main problem to be solved.

The present invention has been made taking the aforementioned circumstance into consideration, and an object thereof is to provide a clutch plate capable of decreasing a dragging torque.

Solution to the Problem

A clutch plate according to the present invention in a first aspect is a clutch plate being an annular shape and a wet type in which lubrication grooves comprising a plurality of grooves are formed on at least one of both end surfaces in an axial direction and in which the end surface has the lubrication grooves and a friction engaging surface; the groove is provided with a groove forming portion that extends in a direction crossing the circumferential direction and that takes a U shape in a section orthogonal to the extending direction, and blunt portions that extend along the extending direction of the groove forming portion on both sides of the groove forming portion and that connect the friction engaging surface with the groove forming portion; the blunt portion is widened as it goes from a bottom of the groove toward an opening in the section orthogonal to the extending direction; and where a virtual straight line is taken as a straight line passing across one side end of the groove and extending in a radial direction, in a section of the groove having the one side end taken along a plane that is orthogonal to the virtual straight line and that includes the one side end, the width of the blunt portion on one side is in a range of 0.12 to 0.35 mm, and the depth of the blunt portion is in a range of 25 to 50 $\mu$m.

A clutch plate according to the present invention in a second aspect is a clutch plate being an annular shape and a wet type in which lubrication grooves comprising a plurality of grooves are formed on at least one of both end surfaces in an axial direction and in which the end surface has the lubrication grooves and a friction engaging surface; the friction engaging surface has a plurality of rise portions which are configured by the plurality of grooves and each of which is defined to be surrounded by at least two non-differentiable points and a plurality of differentiable lines connecting the non-differentiable points; the groove is provided with a groove forming portion that takes a U shape in a section orthogonal to the extending direction, and blunt portions that extend along the extending direction of the groove forming portion on both sides of the groove forming portion and that connect the rise portion with the groove forming portion; the blunt portion is widened as it goes from a bottom of the groove toward an opening in the section orthogonal to the extending direction; and in a section taken along a plane being normal to a tangential line at a predetermined point on each line of the differentiable lines that extends to cross the circumferential direction, the width of the blunt portion on one side is in a range of 0.09 to 0.35 mm, and the depth of the blunt portion is in a range of 20 to 50 $\mu$m.

According to the present invention, the groove has the blunt portions of predetermined dimensions, and thus, it is possible to decrease the dragging torque.

EMBODIMENTS FOR PRACTICING THE INVENTION

Next, the present invention will be described in detail based on preferred embodiments. In the present embodiments, as one example, there will be described a case where a clutch plate according to the present invention is used as a clutch plate for a pilot clutch mechanism in an electronically controlled 4WD coupling (hereinafter referred to as driving force transmission device).

(Driving Force Transmission Device)

Figure 10:
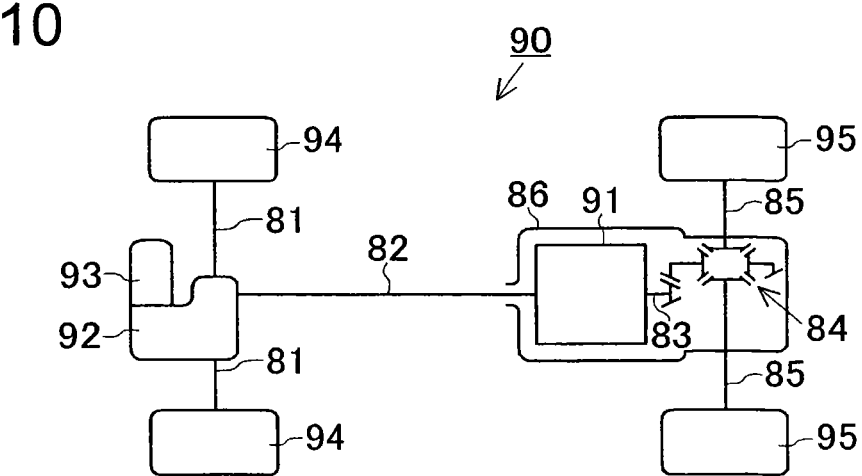
FIG. 10 is an explanatory view for explaining a four-wheel drive vehicle in the embodiment.

A driving force transmission device 91 will be described with reference to FIGS. 10 and 11. First of all, as shown in FIG. 10, a four-wheel drive vehicle 90 is mainly provided with the driving force transmission device 91, a transaxle 92, an engine 93, a pair of front wheels 94 and a pair of rear wheels 95. The driving force of the engine 93 is outputted to axle shafts 81 through the transaxle 92 to drive the front wheels 94.

Further, the transaxle 92 is connected to the driving force transmission device 91 through a propeller shaft 82. Then, the driving force transmission device 91 is connected to a rear differential gear 84 through a drive pinion shaft 83. The rear differential gear 84 is connected to the rear wheels 95 through axle shafts 85. When the propeller shaft 82 and the drive pinion shaft 83 are connected by the driving force transmission device 91 to be able to transmit a torque, the driving force of the engine 93 is transmitted to the rear wheels 95.

The driving force transmission device 91 is housed in, for example, a differential carrier 86 together with the rear differential gear 84, is supported by the differential carrier 86 and is supported by a vehicle body through the differential carrier 86.

Figure 11:
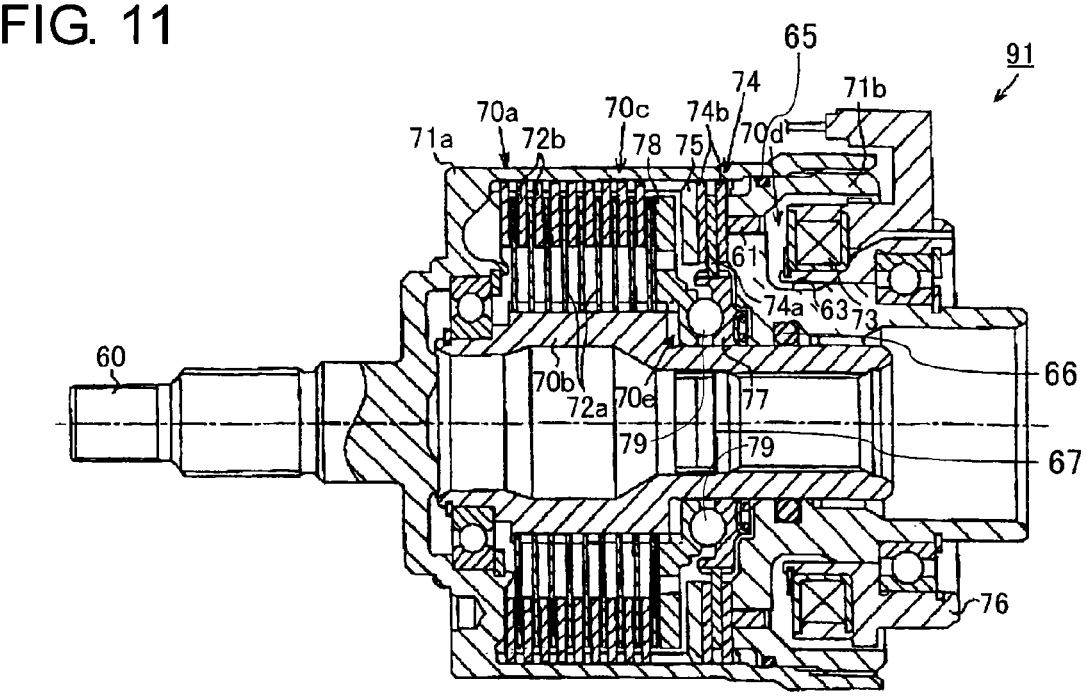
FIG. 11 is a sectional view partly in section showing an electronically controlled 4WD coupling in the embodiment.

As shown in FIG. 11, the driving force transmission device 91 is provided mainly with an outer case 70a as an outer rotational member, an inner shaft 70b as an inner rotational member, a main clutch mechanism 70c, a pilot clutch mechanism 70d and a cam mechanism 70e.

The outer case 70a is composed of a front housing 71a of a bottomed cylindrical shape and a rear housing 71b fixedly screwed into a rear end opening portion of the front housing 71a to cover the opening portion. An input shaft 60 is formed to protrude from a front end portion of the front housing 71a. The input shaft 60 is connected to the propeller shaft 82.

The front housing 71a integrally formed with the input shaft 60 and the rear housing 71b are made of iron being a magnetic material. A sleeve member 61 made of a stainless steel being a non-magnetic material is embedded in a radially mid portion of the rear housing 71b, and the sleeve member 61 constitutes an annular non-magnetic portion.

The outer case 70a is rotatably supported by the differential carrier 86 through a bearing or the like (not shown) at the outer periphery of a front end portion of the front housing 71a. Further, the outer case 70a is supported by a yoke 76, supported by the differential carrier 86, through a bearing or the like at an outer periphery of the rear housing 71b.

The inner shaft 70b fluid-tightly penetrates through a center portion of the rear housing 71b to be inserted into the front housing 71a and is supported rotatably relative to the front housing 71a and the rear housing 71b with its axial movement restricted. An extreme end portion of the drive pinion shaft 83 is inserted into the inner shaft 70b. In the figure, the drive pinion shaft 83 is not shown.

The main clutch mechanism 70c is a multiple disc wet clutch mechanism and is provided with a plurality of inner clutch plates 72a made of iron and each having friction paper materials affixed at sliding surfaces thereof, and a plurality of outer clutch plates 72b made of iron. The inner clutch plates 72a and the outer clutch plates 72b are placed on the bottom wall side of the front housing 71a.

The respective inner clutch plates 72a composing the clutch mechanism are spline-fitted on an outer periphery of the inner shaft 70b to be assembled movably in the axial direction. On the other hand, the respective outer clutch plates 72b are spline-fitted on an internal surface of the front housing 71a to be assembled movably in the axial direction. The respective inner clutch plates 72a and the respective outer clutch plates 72b are alternately placed in the axial direction and are brought into mutual contact to be frictionally engageable or into mutual separation to come to a released state of being out of engagement.

The pilot clutch mechanism 70d is provided with an electromagnet 73, a friction clutch 74 and an armature 75. The electromagnet 73 and the armature 75 constitute electromagnetic drive means.

The yoke 76 is supported by the differential carrier 86 in the manner of a spigot joint and is supported rotatably relative to the outer periphery of a rear end portion of the rear housing 71b. The electromagnet 73 of an annular shape is fitted on the yoke 76 and is arranged in an annular concave portion 63 of the rear housing 71b.

The friction clutch 74 is constructed as a multiple disc friction clutch that comprises a single-piece inner pilot clutch plate 74a made of iron and two outer pilot clutch plates 74b made of iron. In the embodiments described later, as an example of the clutch plate according to the present invention, there is exemplified a case where the present invention is applied to the inner pilot clutch plate 74a.

The inner pilot clutch plate 74a is axially movably assembled by being spline-fitted on the outer periphery of a first cam member 77 composing the cam mechanism 70e. On the other hand, the respective outer pilot clutch plates 74b are axially movably assembled by being spline-fitted on the internal surface of the front housing 71a.

The inner pilot clutch plate 74a and the respective outer clutch plates 74b are arranged alternately in the axial direction and are brought into mutual contact to be frictionally engageable or into mutual separation to come to a released state of being out of engagement.

A second cam member 78 is spline-fitted on the outer periphery of the inner shaft 70b movably in the axial direction and is assembled rotatably bodily with the inner shaft 70b. The second cam member 78 is arranged to face the inner clutch plate 72a of the main clutch mechanism 70c. Ball-like cam followers 79 reside in mutually facing cam grooves on the second cam member 78 and the first cam member 77.

In the driving force transmission device 91, when electric current is not supplied to an electromagnetic coil of the electromagnet 73 composing the pilot clutch mechanism 70d, no magnetic path is formed, so that the friction clutch 74 is in a state of being out of engagement. In this case, the pilot clutch mechanism 70*d* is in a state of being out of operation, and the first cam member 77 composing the cam mechanism 70*e* can rotate integrally with the second cam member 78 through the cam followers 79, so that the main clutch mechanism 70*c* is in a state of being out of operation. Thus, the four-wheel drive vehicle 90 constitutes a drive mode for two-wheel driving.

On the other hand, when electric current is supplied to the electromagnetic coil of the electromagnet 73, a magnetic path is formed across the pilot clutch mechanism 70*d*, whereby the electromagnet 73 attracts the armature 75. In this case, the armature 75 is pressured on the friction clutch 74 to bring the same into friction engagement, and this causes the first cam member 77 of the cam mechanism 70*e* to be connected to the front housing 71*a* side, whereby relative rotation occurs between the first cam member 77 and the second cam member 78. Consequently, in the cam mechanism 70*e*, the cam followers 79 press the both cam members 77, 78 in the mutual separation directions from each other.

As a result, the second cam member 78 is pressed on the main clutch mechanism 70*c* side to bring the main clutch mechanism 70*c* into friction engagement in dependence on the friction engaging force of the friction clutch 74 to perform a torque transmission between the outer case 70*a* and the inner shaft 70*b*. Therefore, the four-wheel drive vehicle 90 constitutes a drive mode for four-wheel driving with the propeller shaft 82 and the drive pinion shaft 83 held out of a direct coupling state.

Further, when the applied electric current to the electromagnetic coil of the electromagnet 73 is raised to a predetermined value, the attraction force of the electromagnet 73 acting on the armature 75 is increased. Then, the armature 75 is strongly attracted toward the electromagnet 73 side to increase the friction engaging force of the friction clutch 74, and this causes the relative rotation between the both cam members 77, 78 to increase. Therefore, the cam followers 79 increase the pressing force against the second cam member 78 and bring the main clutch mechanism 70*c* into a coupling state. Consequently, the four-wheel drive vehicle 90 constitutes a drive mode in which the propeller shaft 82 and the drive pinion shaft 83 are coupled directly.

First Embodiment

Figure 4:
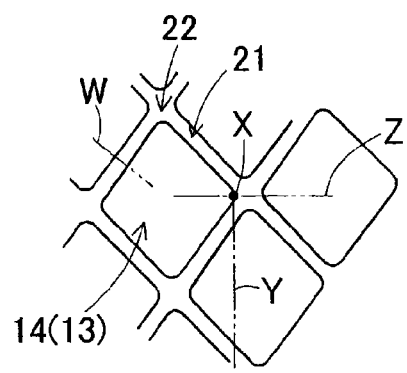
FIG. 4 is an enlarged fragmentary view showing the clutch plate 1 in the first embodiment.
Figure 5:
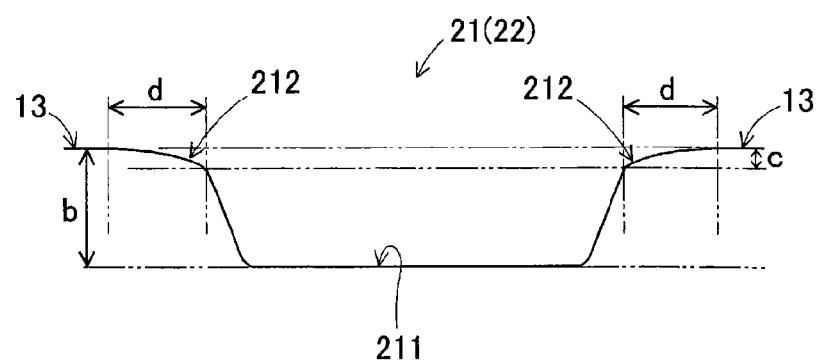
FIG. 5 is a sectional view taken along a plane Z of the groove 21 in the first embodiment.

A clutch plate 1 in a first embodiment will be described with reference to FIGS. 1-9. FIG. 2 and FIG. 5 are illustrated with the ratio of the vertical direction to the left-right direction altered for the convenience in drawing the figures. As one example, the clutch plate 1 is applied to the aforementioned inner pilot clutch plate 74*a*.

Figure 1:
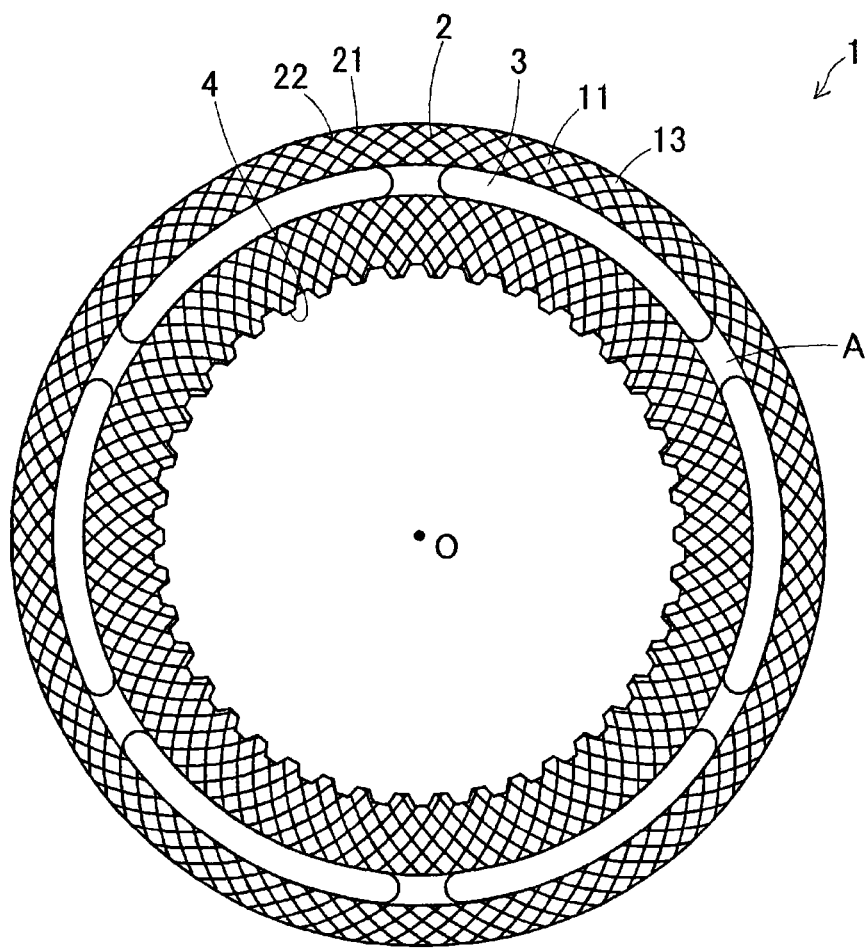
FIG. 1 is a front view showing a clutch plate 1 in a first embodiment.
Figure 2:
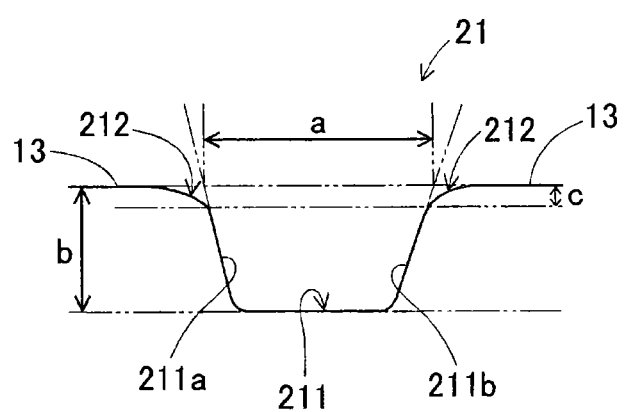
FIG. 2 is a sectional view showing a groove 21 in the first embodiment and taken in a direction orthogonal to the extending direction.

As shown in FIG. 1, the clutch plate 1 is constituted by an annular magnetic metal plate, and has respective lubrication grooves 2 formed on both of one axial end surface 11 and the other axial end surface (not shown). The other axial end surface is formed with the same lubrication grooves 2 as those on the one axial end surface 11.

The end surface 11 has the lubrication grooves 2 and a friction engaging surface 13 on which respective plates frictionally engage with each other. The friction engaging surface 13 is a section on the end surface 11 except for the lubrication grooves 2, windows 3 and empty portions A and takes the form of a flat surface. The axial direction is the direction that is parallel to the center axis of the annular shape and can be grasped as the direction parallel to the input shaft 60.

The lubrication grooves 2 are configured to receive superfluous lubrication oil existing between the aforementioned both pilot clutch plates 74*a*, 74*b*. That is, the clutch plate 1 is a wet clutch plate. The lubrication grooves 2 perform the functions of receiving the lubrication oil between the plates and discharging the lubrication oil from between the plates. Thus, the engagement of the plates can be done smoothly.

Further, at an almost intermediate part in the radial direction on the end surface 11 of the clutch plate 1, the plurality of windows 3 each of which is an arc-shaped through hole piercing in the axial direction are arranged on the same circle. The windows 3 are required for forming an appropriate magnetic circuit (magnetic path) in the pilot clutch mechanism. Further, a spline 4 is formed on the internal surface of the clutch plate 1.

Figure 3:
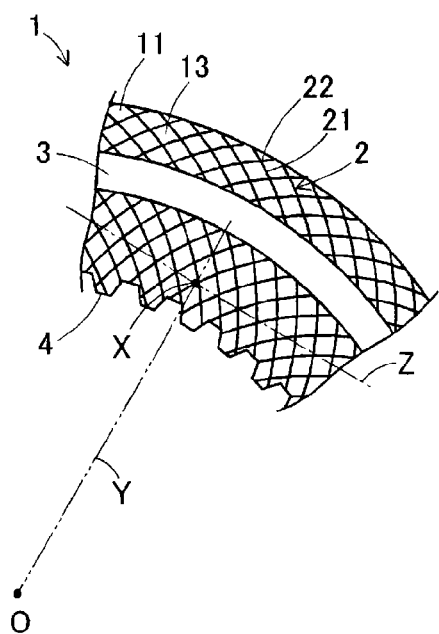
FIG. 3 is an enlarged fragmentary view showing the clutch plate 1 in the first embodiment.

As shown in FIGS. 1 and 3, the lubrication grooves 2 comprise a plurality of grooves 21. The lubrication grooves 2 extend entirely on the both end surfaces 11 to extend from an intermediate part on each surface to an outer peripheral verge and an inner peripheral verge (the verge of the spline 4). The lubrication grooves 2 are formed at the whole surface except for the windows 3 and the spaces (empty portions A) between the windows 3.

In the present embodiment, the lubrication grooves 2 are formed in the form of a lattice (mesh form). The grooves 21 extend from the outer peripheral verge to the windows 3 or the empty portions A on the outer peripheral side and extend from the windows 3 or the empty portions A to the inner peripheral verge (the verge of the spline 4) on the inner peripheral side. That is, the grooves 21 of the lubrication grooves 2 extend in the directions crossing the circumferential direction on the both end surfaces 11. Then, the lubrication grooves 2 have a plurality of intersection points 22 where the respective grooves 21 contact (herein, intersect) with one another.

As shown in FIG. 2, each groove 21 has a groove forming portion 211 and blunt portions 212. The groove forming portion 211 takes a U shape in the section (refer to W in FIG. 4) orthogonal in the extending direction of the groove 21. For the reason of the manufacturing, the groove forming portion 211 is enlarged in width as it goes from the bottom to an opening of the groove 21 in the section orthogonal to the extending direction. The side walls 211*a*, 211*b* of the groove forming portion 211 are each formed to be almost flat shape and are inclined relative to the axial direction. The side walls 211*a*, 211*b* of the groove forming portions 211 may be formed in parallel to the axial direction.

The blunt portions 212 are portions located at the both sides of the groove forming portion 211 (at the left and right sides in FIG. 2), extending in the extending direction of the groove forming portion 211 and connecting the friction engaging surface 13 with the groove forming portion 211. Each blunt portion 212 takes a convex arc shape having an almost predetermined curvature in the section orthogonal to the extending direction and is enlarged in width as it goes from the bottom to the opening of the groove 21. The widened width degree (the inclination relative to the axial direction) of the blunt portions 212 is larger than that of the groove forming portion 211.

Like this, the end surface 11 is formed with the friction engaging surface 13, the blunt portions 212, the groove forming portions 211, the windows 3 and the empty portions A.

In the present embodiment, the width a of the grooves 21 is approximately in a range of 0.1 to 0.5 mm. As shown in FIG. 2, the width a of the grooves 21 in the present invention means a space distance between two intersection points where extension lines extended along the side walls 211*a*, 211*b* of the groove forming portion 211 intersect with an extension line extended along the friction engaging surface 13.

The depth b of the grooves 21 is the distance from the bottom to the opening portion (or a flat surface including the friction engaging surface 13) of the groove 21. In the present embodiment, the depth of the grooves 21 is approximately in a range of 0.1 to 0.2 mm.

Here, the dimensions of the blunt portions 212 will be described. In the present invention, the dimensions of each blunt portion 212 are the dimensions on a section referred to later. In the description of this section, as shown in FIG. 3, first of all, a straight line passing across one side end X where a groove 21 exists, and extending in (parallel to) a radial direction of the clutch plate 1 is regarded as a virtual line Y. Then, as shown in FIGS. 3 and 4, the section prescribing the dimensions of the blunt portion 212 in the present invention is a section Z that is taken along a plane Z being orthogonal to the virtual straight line Y and including the one side end X. The one side end means a point at the end portion (the verge) on one side of the both sides of the groove 21. In the present embodiment, the one side end X is set to an intersection point 22 of the grooves 21.

As shown in FIG. 5, in the section Z, the width d of the blunt portion 212 on one side is in a range of 0.12 to 0.35 mm, and the depth c of the blunt portion 212 is in a range of 25 to 50 µm. The object to be measured is the groove 21 having the one side end X. In the section Z, the width d is the length in a direction orthogonal to the axial direction, the depth c is the length in the axial direction. The dragging torque is influenced by the shape of asperities in the circumferential direction of the clutch plate 1 (corresponding to the section Z at the one side end X).

Figure 6:
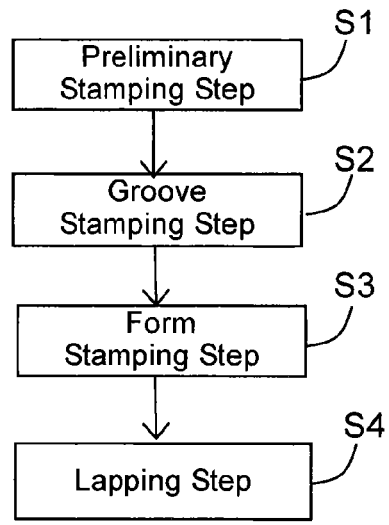
FIG. 6 is a process diagram showing manufacturing steps of the clutch plate 1 in the first embodiment.

In a manufacturing method for the clutch plate 1, there are used press workings. As shown in FIG. 6, the manufacturing method mainly includes a preliminary stamping step S1, a groove stamping step S2, a form stamping step S3 and a lapping step S4.

The preliminary stamping step S1 is a step of roughly forming an inner peripheral verge and an outer peripheral verge of the clutch plate 1 on a magnetic metal plate (here, steel plate) M. The groove stamping step S2 is a step of pressing a pattern of the lubrication grooves 2 on the both end surfaces 11, 12 of the steel plate M. The form stamping step S3 is a step of forming the inner peripheral verge (here, the spline 4), the outer peripheral verge and the windows 3 of the clutch plate 1. The lapping step S4 is a step that is performed after the groove stamping step S2 or after a step subsequent thereto for lapping the friction engaging surfaces 13 to raise the degree of flatness.

The dimensions of the blunt portions 212 can be adjusted by the pressing force by a press or through the lapping step S4. It is possible by the adjustment of the pressing force to adjust the rising amount of the friction engaging surfaces 13, and it is possible by the adjustment of the lapping amount in the lapping at the lapping step S4 to adjust the depth c and the width d of the blunt portions 212.

The clutch plate 1 having the aforementioned grooves 21 can be formed by a conventional manufacturing method being, for example, a method of performing respective pressings in the order of the preliminary stamping step S1→the groove stamping step S2→a flat stamping step→the form stamping step S3→the lapping step S4. The flat stamping step is a step of stamping the raised friction engaging surface 13 to make the same flat. In the prior art, the blunt portions are removed at the lapping step S4, whereas in the present invention, the lapping is done to make the blunt portions left at a suitable amount, so that the blunt portions 212 can be formed.

Implemented Example 1

In the clutch plate 1, the width d of the blunt portions 212 was approximately 0.14 mm, and the depth c of the blunt portions 212 was approximately 32 µm. The blunt portions 212 took a convex arc shape, whose curvature radius was approximately 0.86 mm.

Figure 7:
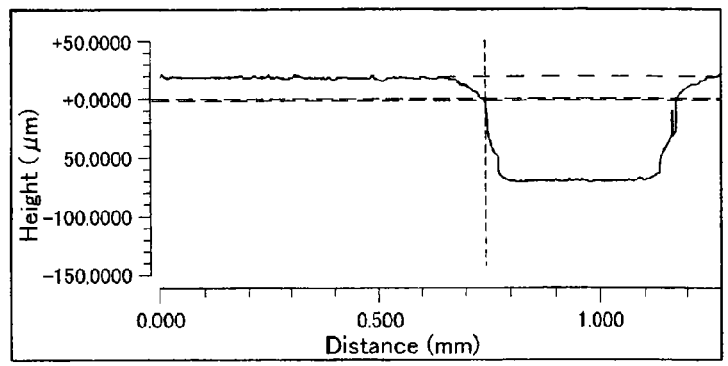
FIG. 7 is a graph showing the measurement result of a surface state in implemented example 1.

The depth b of the grooves 21 was 0.13 mm. In the manufacturing, the depth b of the grooves 21 fluctuates in connection roughly with the dimensions of the blunt portions 21. The area of one land 14 (the portion surrounded by the grooves 21) being a part of the friction engaging surface 13 was approximately 3.3 mm$^2$. The groove 21 (the intersection point 22) measured is located on the inner peripheral side relative to the windows 3. A measuring device used for measuring the dimensions was "ZYGO NewView (registered trademark) 7300". The details of the measuring condition are as follows. The measuring device is the aforementioned "ZYGO NewView (registered trademark) 7300", and the constitution is of a white light interferometry type, the object lens is of 10 times in magnification, the zoom lens is of the same scale in magnification, the camera mode has 640×480 pixels, the scanning system is of a motor scanning, and the images combined are 9×9 images. For reference, the measurement result is shown in FIG. 7. In FIG. 7, the unit for the axis of abscissas is millimeter, and the unit for the axis of ordinates is micron meter.

The dragging torques at low temperatures (−20° C., −40° C.) were measured on the clutch plate 1 in the implemented example 1. The measuring device for dragging torque is a coupling performance tester manufactured by Shinko Engineering Co., Ltd. The measuring conditions were conventionally used conditions, wherein the measuring was done in the state that two clutch plates 1 were put between three outer pilot clutch plates in an alternate fashion. The values of the measured dragging torques included the values of dragging torques that were generated by sixth inner clutch plates 72a and sixth outer clutch plates 72b alternately arranged in the main clutch mechanism 70c and the lubrication oil existing between these clutch plates. An ATF-base fluid dedicated to 4WD couplings was used as the lubrication oil. The kinematic viscosity of the used ATF-base fluid dedicated to 4WD couplings is as follows. The kinematic viscosity is 4833 mm$^2$/s at −40° C., 23.13 mm$^2$/s at 40° C. and 4.8 mm$^2$/s at 100° C. No electric current was supplied to the electromagnet 73.

The lubrication oil was filled up to almost 80% of a space for the lubrication oil to be charged in the driving force transmission device 91. The space for the lubrication oil to be charged is a space defined by the front housing 71a, an oil seal 65 (O-ring), the rear housing 71b, the sleeve member 61, an oil seal 66 (X-ring), the inner shaft 70b, and an oil seal 67 (seal cap).

The tester for dragging torque was installed in a cold room. With the cold room set at −20° C., the driving force transmission device 91 was placed to wait until the temperature thereof became −20° C. After the temperature of the driving force transmission device 91 became −20° C., the dragging torque was measured as the inner shaft 70b was rotated relative to the outer case 70a secured to the tester for dragging torque.

The dragging torque is the maximum torque value that is generated while the rotational speed of the inner shaft 70b relative to the outer case 70a is accelerated from 0 (min$^{-1}$) to 300 (min$^{-1}$) at a fixed acceleration in one second and is immediately decelerated from 300 (min$^{-1}$) to 0 (min$^{-1}$) at the fixed acceleration in one second.

Further, likewise, with the room temperature of the cold room set to −40° C., the driving force transmission device 91 was placed to wait until it became −40° C. After the temperature of the driving force transmission device 91 became −40°

C., the dragging torque was measured as the inner shaft 70b was rotated relative to the outer case 70a secured to the tester for dragging torque.

As the measurement results, the dragging torque at −20° C. was 312 Nm. Further, the dragging torque at −40° C. was 517 Nm. In the conventional clutch plate which did not have the blunt portions or had the same almost removed therefrom, the dragging torque at −20° C. was 400-500 Nm, and the dragging torque at −40° C. was 600-700 Nm.

Implemented Example 2

In the clutch plate 1 in implemented example 2, the width d of the blunt portions 212 was approximately 0.24 mm, and the depth c of the blunt portions 212 was approximately 47 μm. The blunt portions 212 took a convex arc shape, whose curvature radius was approximately 1 mm. The depth b of the grooves 21 was 0.15 mm. In the implemented example 2, the measurement for the dimensions and the measurement for the dragging torques were done in the same conditions as those in the implemented example 1. As the measurement results, the dragging torque at −20° C. was 264 Nm. Further, the dragging torque at −40° C. was 463 Nm.

Implemented Example 3

In the clutch plate 1 in implemented example 3, the width d of the blunt portions 212 was approximately 0.28 mm, and the depth c of the blunt portions 212 was approximately 49 μm. The blunt portions 212 took a convex arc shape, whose curvature radius was approximately 1.2 mm. The depth b of the grooves 21 was 0.16 mm. In the implemented example 3, the measurement for the dimensions and the measurement for the dragging torques were done in the same conditions as those in the implemented example 1. As the measurement results, the dragging torque at −20° C. was 240 Nm. Further, the dragging torque at −40° C. was 450 Nm.

Reference Example 1

In a reference example 1 having the same configuration (except for the dimensions) as that of the clutch plate 1, the width d of the blunt portions 212 was approximately 0.1 mm, and the depth c of the blunt portions 212 was approximately 21 μm. The blunt portions 212 took a convex arc shape, whose curvature radius was approximately 0.15 mm. The depth b of the grooves 21 was 0.09 mm. In the reference example 1, measurement for the dimensions and the measurement for the dragging torques were done in the same conditions as those in the implemented example 1. As the measurement results, the dragging torque at −20° C. was 398 Nm. Further, the dragging torque at −40° C. was 663 Nm.

Reference Example 2

In a reference example 2 having the same configuration (except for the dimensions) as that of the clutch plate 1, the width d of the blunt portions 212 was approximately 0.05 mm, and the depth c of the blunt portions 212 was approximately 10 μm. The blunt portions 212 took a convex arc shape, whose curvature radius was approximately 0.05 mm. The depth b of the grooves 21 was 0.2 mm. In the reference example 2, the measurement for the dimensions and the measurement for the dragging torques were done in the same conditions as those in the implemented example 1. As the measurement results, the dragging torque at −20° C. was 410 Nm. Further, the dragging torque at −40° C. was 680 Nm.

Figure 8:
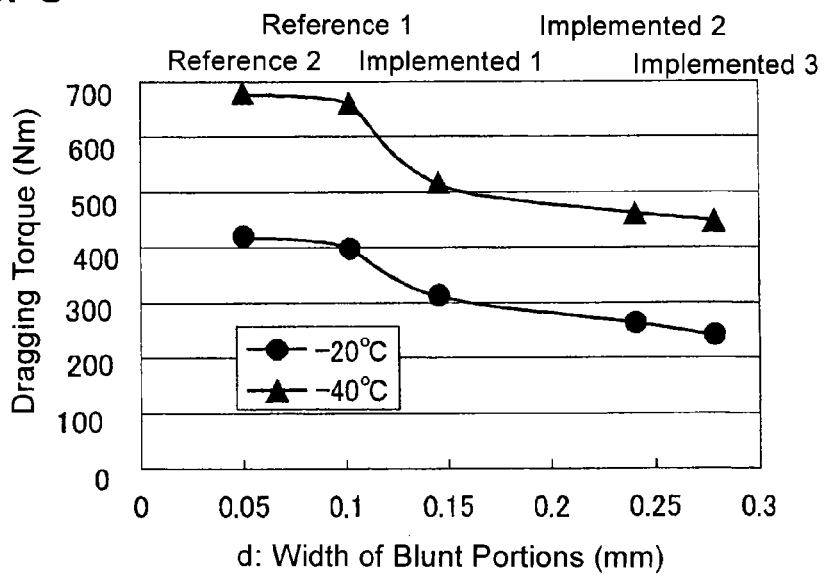
FIG. 8 is a graph showing the relationship between the width d of blunt portions 212 and the dragging torque.
Figure 9:
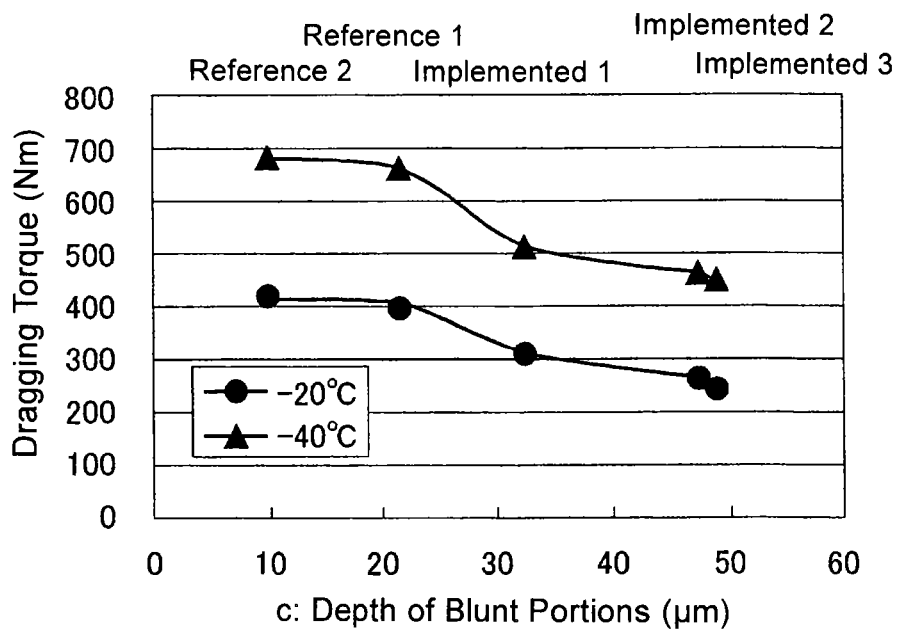
FIG. 9 is a graph showing the relationship between the depth c of the blunt portions 212 and the dragging torque.

FIGS. 8 and 9 show the graphs representing the results in the aforementioned implemented examples 1-3 and the reference examples 1 and 2. As shown in FIGS. 8 and 9, the dragging torque goes down sharply with a change from the reference example 1 to the implemented example 1. That is, the width d of the blunt portions 212 is preferable to be in a range of 0.12 mm being between the reference example 1 and the implemented example 1 to 0.28 mm in the implemented example 3. Likewise, the depth c of the blunt portions 212 is preferable to be in a range of 25 to 50 μm.

According to the present embodiment, for example, the dragging torque becomes less than 400 Nm at −20° C. and less than 600 Nm at −40° C., so that it is possible to decrease the dragging torque at the low temperatures. Even where the temperature is higher than −20° C., the viscosity of the lubrication oil goes down and thus, the dragging torque is decreased further.

In the preferred form including the implemented examples 1-3, the curvature radius of the blunt portions 212 was in a range from 0.5 to 1.3 mm, and the depth b of the grooves 21 was in a range from 0.12 to 0.18 mm. Where the depth b of the grooves 21 was enlarged, the dragging torque became larger with the depth exceeding a certain value. For example, where the depth b of the grooves 21 was set to approximately 0.2 mm, the dragging torque increased. That is, the correlation was not grasped between the depth b of the grooves 21 and the dragging torque, and the correlation was grasped between the dimensions of the blunt portions 212 and the dragging torque. Further, even where the measuring condition such as the number of the plates or the like was changed, there was grasped a change in the absolute value only of the dragging torque, and the ratio (the curves in the graphs) became the same change.

(Modified Forms)

The blunt portions 212 may not take the convex arc shape and may take a flat shape. Further, each groove 21 may take a corrugated (serration) shape that extends in the radial direction as a whole as it is protruded (asperity) in the circumferential direction. Further, each groove 21 may extend in the radial direction without being curved. Further, the lubrication grooves 2 may not have the intersection points 22 thereon. Further, the present embodiment is applicable to other wet clutch plates and is applicable to, for example, the outer pilot clutch plates 74b and the clutch plates 70a, 70b of the main clutch mechanism 70c. Even in these constructions, the same effects as those in the present embodiment can be achieved. Further, the virtual straight line Y is regarded as a straight line that is orthogonal to the center axis O of the annular shape (clutch plate 1) and that passes across the one side end X of a groove 21.

Second Embodiment

Figure 12:
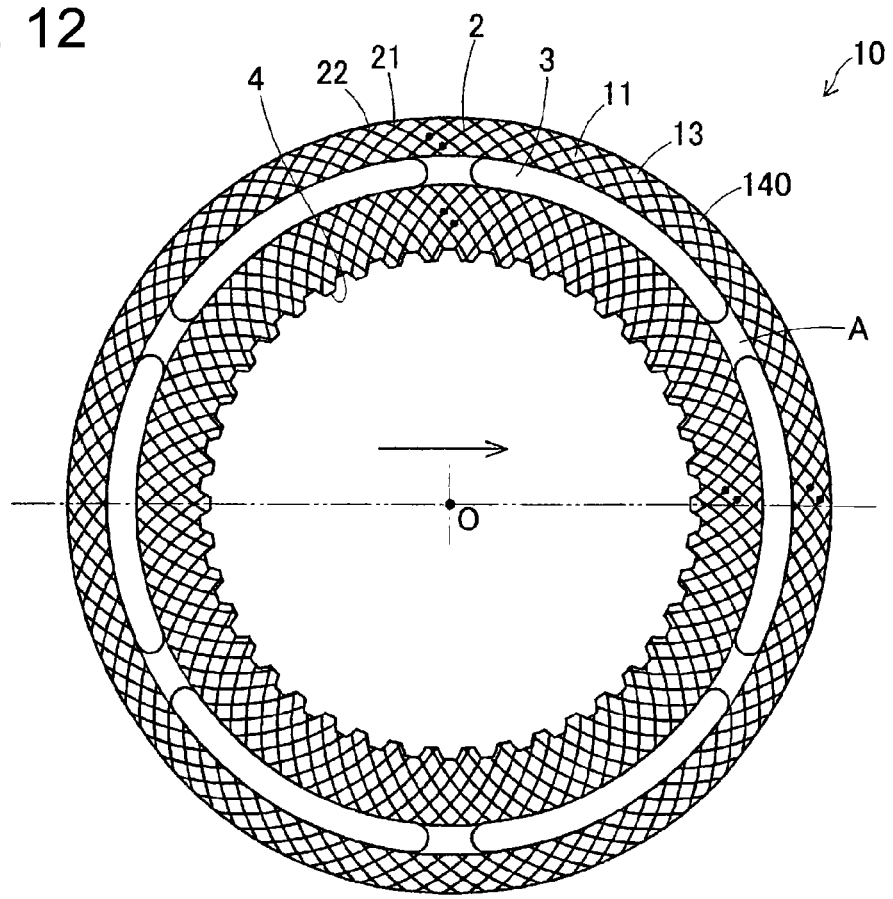
FIG. 12 is a front view showing a clutch plate 10 in a second embodiment.

As shown in FIG. 12, a clutch plate 10 in a second embodiment is the same as that of the first embodiment in construction and use and is constituted by an annular magnetic metal plate, wherein the lubrication grooves 2 are formed on both end surfaces including one axial end surface 11 and the other axial end surface (not shown). The lubrication grooves 2 which are the same as those on the one axial end surface 11 is formed on the other axial end surface. The clutch plate 10 is manufactured by the same manufacturing method as that in the first embodiment.

Like those in the first embodiment, grooves 21 in the second embodiment are formed along the loci of virtual circles (or virtual spheres) having the centers inside the clutch plate 10 (inside the spline 4) so as to cross the circumferential direction (rotational direction) of the clutch plate 10. A plurality of the grooves 21 are formed in correspondence to the plurality of the virtual circles that mutually differ in center. More specifically, the centers of the virtual circles are located at regular intervals on a second virtual circle centered on the center of the clutch plate 10.

The end surface 11 has the lubrication grooves 2 and a friction engaging surface 13 where plates are frictionally engaged with each other. The friction engaging surface 13 is a section on the end surface 11 except for the lubrication grooves 2, windows 3 and empty portions A and takes the form of a flat surface.

The friction engaging surface 13 has a plurality of lands 140 (corresponding to "rise portions"). Each land 140 is a portion that is defined to be surrounded by the plurality of grooves 21. In defining the land 140, the plurality of grooves 21 constitute at least two non-differentiable points and a plurality of differentiable lines connecting the non-differentiable points. In the present invention, the aforementioned points and lines defining the land 140 are prescribed on the assumption that each groove 21 is a line that goes through the center in the width direction of each groove 21 (hereinafter, referred to as "groove center line"). In other words, in defining the land 140 in the present invention, the grooves 21 are defined as lines each having no width. The non-differentiable point means a point whose tangential line is not determined to one, and the differentiable line means a line whose tangential line is determined to one at an arbitrary point on the line.

Figure 13:
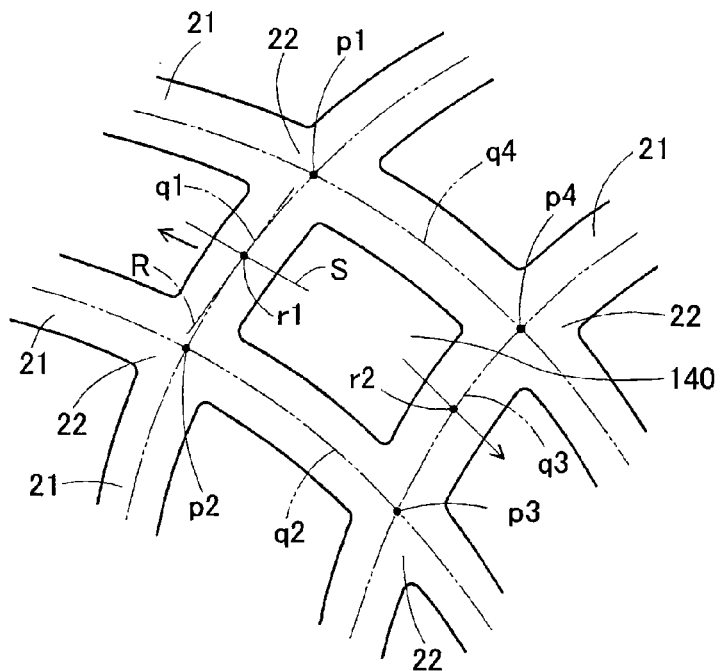
FIG. 13 is a schematic view for explaining grooves 21 and lands 140.

Specifically, as shown in FIG. 13, the intersection points (22) on the groove center lines of the plurality of the grooves 21 are non-differentiable points p1-p4, what connects the points p1 and p2 is a differentiable line q1, what connects the points p2 and p3 is a differentiable line q2, what connects the points p3 and p4 is a differentiable line q3, and what connects the points p4 and p1 is a differentiable line q4. The land 140 in the second embodiment is defined to be surrounded by the four non-differentiable points p1-p4 and the four differentiable lines q1-q4. In the second embodiment, the lines q1-q4 are almost equal in length.

Figure 14:
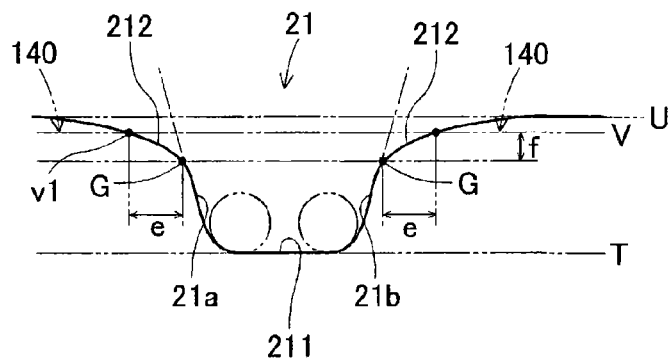
FIG. 14 is a section profile showing a state arising after a form stamping step S3 and before a lapping step S4

Each groove 21 in the second embodiment is the same in construction as that in the first embodiment and, as shown in FIG. 14, has a groove forming portion 211 and blunt portions 212. The blunt portions 212 are formed along the whole circumference of each land 140. Here, let it be assumed that one line q1 of the differentiable lines q1-q4 defining each land 140 is chosen and that a plane orthogonal to a tangential line R going through a predetermined point r1 on the line q1 is taken as a plane S (refer to FIG. 13). The section of the groove 21 taken along the plane S corresponds to a section orthogonal to the extending direction of the groove 21, and the shape of the groove 21 in the section becomes as shown in FIG. 14. That is, the section of the groove 21 taken along the plane S means a section orthogonal to the extending direction of the groove 21 except for those sections at the intersection points 22 or the non-differentiable points p1-p4.

In the second embodiment, as shown in FIG. 14, the section of the groove 21 taken along the plane S is formed to make the width e on one side of the blunt portions 212 in a range of 0.09 to 0.35 mm and to make the depth f of the blunt portions 212 in a range of 20 to 50 μm. In the present embodiment, the depth c of the blunt portions 212 at the intersection points 22 does not agree with the depth f of the blunt portions 212 at other places than the intersection points 22.

Here, description will be made regarding a measuring method for the width e and the depth f of the blunt portions 212 in the second embodiment. FIG. 14 is a section profile showing a state that arises after the form stamping step S3 and before the lapping step S4. In the section profile in FIG. 14, a reference line T is drawn firstly. The reference line T is drawn as described below. There are drawn a round R on one side of the groove bottom and a round R on the other side. There are designated bounds in which the round R on one side agrees with a groove bottom line on one side, and bounds in which the round R on the other side agrees with a groove bottom line on the other side. Then, the reference line T is drawn to go across two points that include a boundary point on the groove bottom side in the bounds on one side and a boundary point on the groove bottom side in the bounds on the other side.

Subsequently, inflection points G are designated on the side surfaces 21a, 21b of the groove 21. The inflection points G are points at each of which a curvature changes and which become boundaries between side surfaces of the groove forming portion 211 and the blunt portions 212. For example, where the inclination of the one side surface 21a of the groove forming portion 211 is represented by a straight line, the position at which the straight line separates from the one side surface 21a of the groove 21 on the opening side becomes the inflection point G.

Thereafter, a parallel line U is drawn that goes across peak points (tops) of the lands (140) before the lapping step S4 and that is parallel to the reference line T. Thereafter, the distance between the inflection point G and the parallel line U is obtained. Finally, a lapping depth (the amount removed by the lapping: 15 μm in the present embodiment) is subtracted from the distance obtained, so that the value after the subtraction is taken as the depth f of the blunt portions 212.

For the calculation of the width e of the blunt portions 212, in consideration of the lapping allowance, there is first drawn a line V that is parallel to the parallel line U to be spaced 15 μm downward from the parallel line U. Then, there is calculated a separation distance in the reference line T direction between an intersection point v1 of the line V with the blunt portion 212 on one side and the inflection point G, and the separation distance is taken as the width e of the blunt portions 212. The depth f of the blunt portions 212 is also grasped as the separation distance between the inflection point G and the line V. The depth f and the width e of the blunt portions 212 are calculated based on the surface of the lands 140 after the lapping step S4, that is, the surface of the lands 140 after the clutch plate is finished as product.

Implemented Example 4

In the clutch plate 10, the width e of the blunt portions 212 was approximately 0.155 mm, and the depth f of the blunt portions 212 was approximately 23 μm. The blunt portions 212 took a convex arc shape.

In each implemented example in the second embodiment, the width e and the depth f of the blunt portions 212 were measured at a plurality of measuring points, and respective average values of those measured were taken to calculate the width e and the depth f. In each implemented example, each average value was measured by designating sixteen places as the measuring points. The measuring points were chosen as points that were on two grooves 21 being adjacent (being opposite) at each of the lands 140 that were at 0-degree and 90-degree positions with respect to a fiber direction (refer to the arrow in FIG. 12). The fiber direction is the extending direction of a fiber flow which was formed by rolling when a steel plate was manufactured as the material forming the clutch plate 10. The dot marks in FIG. 12 indicate the measuring points. As shown in FIG. 12, the measuring points are chosen to take eight places on one end surface 11 and likewise, to take eight places on the other end surface. Each measuring point was set to a mid position on a side (differentiable line) of a land 140 constituted by the respective grooves 21 chosen. That is, as shown in FIG. 13, the measuring point (predetermined point) r1 was set at the mid position of the line q1. The measuring direction at each of the measuring points r1, r2 on the grooves 21 being opposite to each other is a direction that heads from the land 140 toward the groove 21 and that is orthogonal to a tangential line to the groove 21 at the measuring point and is in parallel to the surface of the land 140 (refer to the arrows in FIG. 13).

The depth of the groove 21 before the lapping in the implemented example 4 was approximately 0.142 mm. The area of one land 140 was approximately 3.3 mm². A measuring device used for dimension measurement was a shape measuring device (brand name: SURFCOM 1500DX3 (registered trademark)). As a probe, a stylus (made of sapphire) having a tip angle of 30 degrees was used. The measuring conditions were such that the feed speed was 0.15 mm/s and that the measuring interval was 0.002 mm.

The dragging torques at low temperatures (−20° C., −40° C.) were measured on the clutch plate 10 in the implemented example 4. The measuring device and conditions for the dragging torques were the same as those in the implemented examples 1-3 in the first embodiment. As the measurement results, the dragging torque at −20° C. was 260 Nm. Further, the dragging torque at −40° C. was 460 Nm. In the conventional clutch plate which did not have the blunt portions or had the same almost removed therefrom, the dragging torque at −20° C. was in a range of 400-500 Nm, and the dragging torque at −40° C. was in a range of 600-700 Nm.

Implemented Example 5

In the clutch plate 10 in implemented example 5, the width e of the blunt portions 212 was approximately 0.214 mm, and the depth f of the blunt portions 212 was approximately 37 μm. The blunt portions 212 took a convex arc shape. The depth of the grooves 21 before the lapping was 0.209 mm. In the implemented example 5, the measurement for the dimensions and the measurement for the dragging torques were done in the same conditions as those in the implemented example 4. As the measurement results, the dragging torque at −20° C. was 195 Nm. Further, the dragging torque at −40° C. was 410 Nm.

Implemented Example 6

In the clutch plate 10 in implemented example 6, the width e of the blunt portions 212 was approximately 0.244 mm, and the depth f of the blunt portions 212 was approximately 44 μm. The blunt portions 212 took a convex arc shape. The depth of the grooves 21 before the lapping was 0.240 mm. In the implemented example 6, the measurement for the dimensions and the measurement for the dragging torques were done in the same conditions as those in the implemented example 4. As the measurement results, the dragging torque at −20° C. was 180 Nm. Further, the dragging torque at −40° C. was 350 Nm.

Implemented Example 7

In the clutch plate 10 in implemented example 7, the width e of the blunt portions 212 was approximately 0.248 mm, and the depth f of the blunt portions 212 was approximately 45 μm. The blunt portions 212 took a convex arc shape. The depth of the grooves 21 before the lapping was 0.242 mm. In the implemented example 7, the measurement for the dimensions and the measurement for the dragging torques were done in the same conditions as those in the implemented example 4. As the measurement results, the dragging torque at −20° C. was 175 Nm. Further, the dragging torque at −40° C. was 280 Nm.

Reference Example 3

In reference example 3 of the same construction (except for dimensions) as the clutch plate 10, the width e of the blunt portions 212 was approximately 0.118 mm, and the depth f of the blunt portions 212 was approximately 14 μm. The blunt portions 212 took a convex arc shape. The depth of the grooves 21 before the lapping was 0.106 mm. In the reference example 3, the measurement for the dimensions and the measurement for the dragging torques were done in the same conditions as those in the implemented example 4. As the measurement results, the dragging torque at −20° C. was 305 Nm. Further, the dragging torque at −40° C. was 510 Nm.

Reference Example 4

Reference example 4 was taken as one in which the clutch plate 10 was modified so that the blunt portions 212 were not formed on the grooves 21 (that is, on the differentiable lines q1-q4) except for the intersection points 22. The depth of the grooves 21 before the lapping was 0.100 mm. In the reference example 4, the measurement for the dimensions and the measurement for the dragging torques were done in the same conditions as those in the implemented example 4. As the measurement results, the dragging torque at −20° C. was 400 Nm. Further, the dragging torque at −40° C. was 620 Nm.

Figure 15:
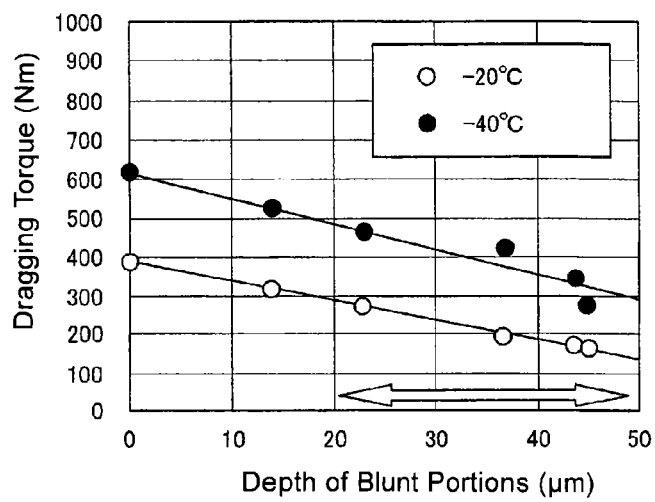
FIG. 15 is a graph showing the relationship between the depth f of blunt portions 212 and the dragging torque.

FIG. 15 is a graph plotting thereon the results of the foregoing implemented examples 4-7 and the foregoing reference examples 3-4. Where the depth f of the blunt portion 212 is less than 20 μm, a fluid wedge effect is difficult to obtain, and a hydraulic reaction force is hard to generate, so that there is a risk that an effect of decreasing the dragging torque cannot be realized sufficiently. Accordingly, it is desirable that the depth f of the blunt portions 212 is 20 μm or more. Further, it is preferable that the depth f of the blunt portions 212 is equal to or 50 μm or less, because where the depth f of the blunt portions 212 exceeds 50 μm, the sliding surface (the sliding area) decreases thereby arousing an anxiety that a sufficient torque characteristic is unable to secure. The sliding surface means a surface that contacts a clutch plate facing therewith and that serves in torque transmission, and corresponds to the friction engaging surface 13 in the present embodiment. The clutch plate 10 is formed so that the ratio (sliding area ratio) of the friction engaging surface 13 on the end surface 11 comes in a range of 55 to 90%.

As shown in FIG. 15, where the depth f of the blunt portions 212 is set in a range of 20 to 50 μm, it is possible to lower the dragging torque to less than 300 Nm at −20° C. and to less than 500 Nm at −40° C. In particular, where the depth f of the blunt portions 212 is in a range of 35 to 50 μm, it is possible to further decrease the dragging torque with the torque characteristic maintained.

The dragging torque corresponds to a shearing force τ (shearing resistance) between the clutch plates (the outer clutch plate and the inner clutch plate). The shearing force τ is expressed by $\tau = \eta \times (U/h)$ and is influenced by a gap h between the clutch plates. η is a lubrication oil viscosity, and U is a relative speed between the clutch plates. Because the blunt portions 212 are on the grooves 21, a hydraulic reaction force is generated against the inflow of fluid and influences the gap h between the clutch plates. That is, the depth f of the blunt portions 212 on the grooves that cross the circumferential direction (rotational direction) of the clutch plate 10 relates largely to the dragging torque.

Figure 16:
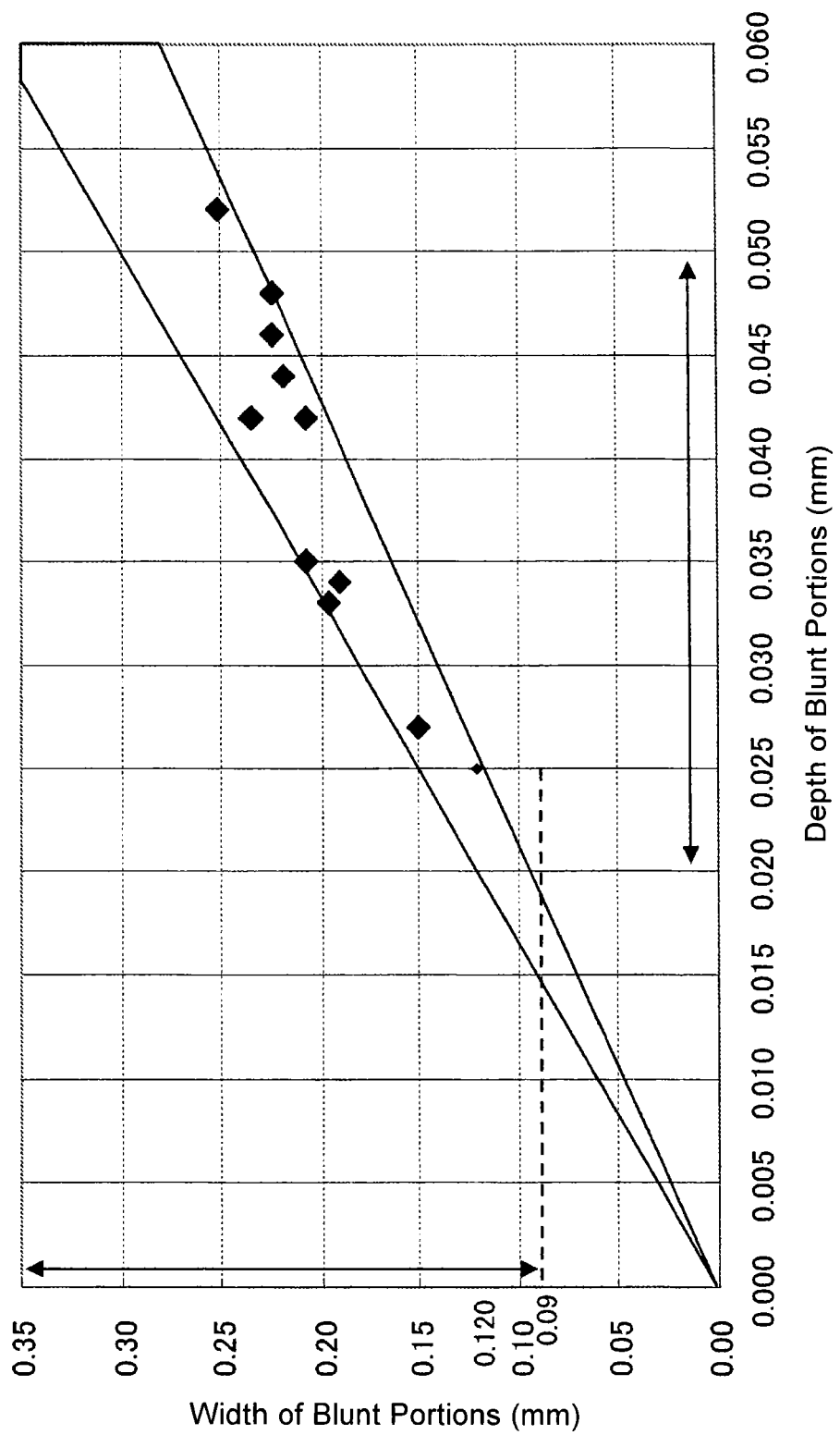
FIG. 16 is a graph showing the relationship between the depth f and the width e of the blunt portions 212.

Further, many of the clutch plates 10 were manufactured in addition to those in the implemented examples 4-7 and were inspected as to the correlation between the depth f and the width e of the blunt portions 212 in the second embodiment. The manufacturing method and the measuring method were the same as those in the implemented examples 4-7. As shown in FIG. 16, a correlation can be grasped between the depth f and the width e of the blunt portions 212. To be proportionate to the depth f range of 20 to 50 µm for the blunt portions 212 in the second embodiment, the width e of the blunt portions 212 was made approximately in a range of 0.09 to 0.35 µm. That is, the aforementioned effects can be attained where the blunt portions 212 are formed to be approximately in a range of 20 to 50 µm in the depth f and to be in a range of 0.09 to 0.35 mm in the width e.

According to the clutch plate 10 in the second embodiment, it is possible to decrease the dragging torque at low temperatures. The clutch plate 10 in the second embodiment is not limited to the aforementioned and may take modified forms like the modified forms in the first embodiment. Further, the shape of the lands 140 may be a polygon. The depth f of the blunt portions 212 is also grasped as a crowning amount. Further, by the combination of the first embodiment with the second embodiment, it is possible to decrease the dragging torque further reliably. Further, in the clutch plate 10 in the second embodiment, each of many lands (rise portions) are defined to be surrounded by the four non-differentiable points and the four differentiable lines. However, each land may be defined to be surrounded by two non-differentiable points and two differentiable lines. Further, each land may be defined to be surrounded by three non-differentiable points and three differentiable lines. Further, each land may be defined to be surrounded by five or more non-differentiable points and differentiable lines of the same number as the non-differentiable points.

The invention claimed is:

1. A clutch plate being an annular shape and a wet type in which lubrication grooves comprising a plurality of grooves are formed on at least one of both end surfaces in an axial direction and in which the end surface has the lubrication grooves and a friction engaging surface;
wherein the groove is provided with a groove forming portion that extends in a direction crossing a circumferential direction and that takes a U shape in a section orthogonal to an extending direction, and blunt portions that extend along the extending direction of the groove forming portion on both sides of the groove forming portion and that connect the friction engaging surface with the groove forming portion;
wherein the blunt portion is widened as it goes from a bottom of the groove toward an opening in a section orthogonal to the extending direction; and
wherein, where a virtual straight line is taken as a straight line passing across one side end of the groove and extending in a radial direction, in a section of the groove having the one side end taken along a plane that is orthogonal to the virtual straight line and that includes the one side end, a width of the blunt portion on one side is in a range of 0.12 to 0.35 mm, and the depth of the blunt portion is in a range of 25 to 50 µm.

2. A clutch plate being an annular shape and a wet type in which lubrication grooves comprising a plurality of grooves are formed on at least one of both end surfaces in an axial direction and in which the end surface has the lubrication grooves and a friction engaging surface;
wherein the friction engaging surface has a plurality of rise portions which are configured by the plurality of grooves and each of which is defined to be surrounded by at least two non-differentiable points and a plurality of differentiable lines connecting the non-differentiable points;
wherein the groove is provided with a groove forming portion that takes a U shape in a section orthogonal to an extending direction, and blunt portions that extend along the extending direction of the groove forming portion on both sides of the groove forming portion and that connect the rise portion with the groove forming portion;
wherein the blunt portion is widened as it goes from a bottom of the groove toward an opening in a section orthogonal to the extending direction; and
wherein in a section taken along a plane being normal to a tangential line at a predetermined point on each line of the differentiable lines that extends to cross the circumferential direction, a width of the blunt portion on one side is in a range of 0.09 to 0.35 mm, and a depth of the blunt portion is in a range of 20 to 50 µm.

3. The clutch plate in claim 1, wherein:
the width of the blunt portion on one side is in a range of 0.12 to 0.28 mm.

* * * * *